US 12,001,908 B2

United States Patent
Craciun

(10) Patent No.: US 12,001,908 B2
(45) Date of Patent: Jun. 4, 2024

(54) METHOD FOR IDENTIFYING A PASSIVE RFID CARD

(71) Applicant: Continental Automotive Technologies GmbH, Hannover (DE)

(72) Inventor: Serban Craciun, Timisoara (RO)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 17/801,010

(22) PCT Filed: Jan. 15, 2021

(86) PCT No.: PCT/EP2021/050755
§ 371 (c)(1),
(2) Date: Aug. 19, 2022

(87) PCT Pub. No.: WO2021/164960
PCT Pub. Date: Aug. 26, 2021

(65) Prior Publication Data
US 2023/0098471 A1 Mar. 30, 2023

(30) Foreign Application Priority Data
Feb. 20, 2020 (EP) .................................. 20465507

(51) Int. Cl.
*G06K 7/10* (2006.01)
(52) U.S. Cl.
CPC ................. *G06K 7/10366* (2013.01)
(58) Field of Classification Search
CPC ............ G06K 7/10366; G06K 7/10009; H02J 7/00045; H02J 50/80; H02J 50/10
See application file for complete search history.

(56) References Cited

U.S. PATENT DOCUMENTS

2007/0262849 A1 11/2007 Ismail
2008/0203158 A1* 8/2008 Wieser .................. G08B 21/24
235/385
(Continued)

FOREIGN PATENT DOCUMENTS

WO 9852142 A1 11/1998
WO 2019038089 A1 2/2019

OTHER PUBLICATIONS

Stephane Czeck "Preventing damages to RFID cards", https://www.wirelesspowerconsortium.com/data/downloadables/1/8/6/8/05-rfidcarddetection.pdf, 2019.
(Continued)

*Primary Examiner* — Matthew Mikels

(57) ABSTRACT

Disclosed is a method for identifying an RFID card as a passive or an active RFID card comprising sending a first RFID command, while keeping an RFID field on; receiving, from the RFID card a corresponding first answering signal; populating a first list with each corresponding first answering signal from the RFID card; sending a second RFID command, wherein the RFID field is paused for a predefined pausing period after sending the second RFID command; receiving, from at least zero active RFID cards, a corresponding second answering signal; populating a second list with each corresponding second answering signal from the at least zero active RFID cards; comparing the entries of the first list with the entries of the second list; identifying each of the at least zero passive RFID cards by having the corresponding first answering signal in the first list but not in the second list.

12 Claims, 2 Drawing Sheets

(56) References Cited

U.S. PATENT DOCUMENTS

| | | |
|---|---|---|
| 2010/0026454 A1 | 2/2010 | Rowse et al. |
| 2010/0264454 A1 | 10/2010 | Yi et al. |
| 2013/0046660 A1* | 2/2013 | Lowenthal ............ B60L 53/665 705/30 |
| 2015/0356329 A1 | 12/2015 | Erez et al. |

OTHER PUBLICATIONS

Search Report dated Jul. 9, 2020 from corresponding European patent application No. 20465507.0.
International Search Report and Written Opinion dated Apr. 19, 2021 from corresponding International patent application No. PCT/EP2021/050755.
Office Action dated Jan. 9, 2024 from corresponding Korean patent application No. 10-2022-7025538.
Notice of Allowance dated Mar. 14, 2024 from corresponding Korean patent application No. 10-2022-7025538.

* cited by examiner

METHOD FOR IDENTIFYING A PASSIVE RFID CARD

FIELD OF THE INVENTION

The invention relates to the field of RFID cards, particularly to RFID cards in a field of a wireless charging system. The invention further relates to an apparatus, to a vehicle with this apparatus, and to a use.

BACKGROUND

RFID (Radio-Frequency Identification) cards are used for numerous applications, for instance as a transponder, smart label, smartcard, an access control for an entry system, or as a component in an NFC (Near-Field Communication) system. An RFID card may be implemented as a passive RFID card or as an active RFID card. Passive RFID systems or RFID cards, sometimes called "physical RFID card", use tags with no internal power source, possibly with a small energy buffer. Passive RFID cards are powered by an energy source from an RFID device, e.g. from an RFID reader, wherein the energy is transmitted via an electromagnetic field (the RFID field). Active RFID systems or RFID cards, sometimes called "emulated NFC card", use battery-powered RFID tags. Active RFID systems or RFID cards may be implemented, e.g., as a part of a smartphone, tablet and/or a similar device. Active RFID cards may be part of an NFC system, for instance for payment solutions and/or other applications. When being in a field of a wireless charging system, there may be a risk, at least for some passive RFID cards, of being damaged by the wireless charging system.

DESCRIPTION

It is therefore an objective of the invention to provide a method for detecting RFID cards. This objective is achieved by the subject-matter of the independent claims. Further embodiments are evident from the dependent patent claims and the following description.

One aspect relates to a method for identifying an RFID card as a passive RFID card or an active RFID card. The method comprises the steps of:
  sending a first RFID command, while keeping an RFID field on;
  receiving, from the at least zero passive RFID cards and the at least zero active RFID cards, a corresponding first answering signal;
  populating a first list with each corresponding first answering signal from the at least zero passive RFID cards and the at least zero active RFID cards;
  sending a second RFID command, wherein the RFID field is paused for a predefined pausing period after sending the second RFID command;
  receiving, from the at least zero active RFID cards, a corresponding second answering signal;
  populating a second list with each corresponding second answering signal from the at least zero active RFID cards;
  comparing the entries of the first list with the entries of the second list;
  identifying each of the at least zero passive RFID cards by having its corresponding first answering signal in the first list but not in the second list.

The sending of the first RFID command may comprise to send a so-called "NFC TX" or any other RFID command that is suited and/or configured to find and/or to scan for RFID cards. The sending may be performed by any RFID device, e.g. by an RFID reader, an RFID card identifying device, and/or other RFID devices. The sending comprises to build up an RFID field (and/or "NFC field"), particularly an electromagnetic modulated RFID field. The RFID device may support one or more RFID frequency-bands. The RFID device may be part of a multiband wireless charging device and/or interface.

During sending and after having sent the first RFID command, the RFID field is kept on, i.e. it is, for instance, not stopped or paused immediately after the first RFID command, but is maintained, at least for a time period long enough for not disturbing a function of a passive RFID card. Disturbing may comprise to disturb any one of the RFID protocol levels. Examples may comprise the interrupt the passive RFID card's energy supply, its clock synchronization, any acknowledgement, and/or another externally recognizable part of an RFID specification.

Sending the first RFID command stimulates each RFID card within an "RFID distance"—usually defined as a quite small one—to send a first answering signal. There may be no RFID card available and/or reachable within the "RFID distance". In this case, no first answering signal received. Otherwise, the corresponding first answering signal is received from each one of the at least zero passive RFID cards and the at least zero active RFID cards. The corresponding first answering signal may comprise a unique content, e.g. an identifier, in order to distinguish each RFID card from another. Considering the first answering signal, it may be difficult or even impossible to tell passive RFID cards from active RFID cards.

The first answering signals may be used for populating the first list with each corresponding first answering signal from the at least zero passive RFID cards and the at least zero active RFID cards. The first list may distinguish the RFID cards by means of any one of their unique content, e.g. by their identifier.

After having sent the first RFID command, the second RFID command is sent. Other than the first RFID command, the RFID field is paused for the predefined pausing period after sending the second RFID command. The duration of the predefined pausing period may depend on an RFID specification. The time period is at least long enough for disturbing a function of a passive RFID card. Disturbing may comprise any one of the RFID protocol levels. Examples may comprise the interrupt the passive RFID card's energy supply, its clock synchronization, any acknowledgement, and/or another externally recognizable part of an RFID specification. Since the second RFID command is recognizable as a correct RFID command, active RFID cards are not disturbed by pausing the RFID field for the predefined pausing period after sending the second RFID command. Hence, from the at least zero active RFID cards, a corresponding second answering signal is received.

The second answering signals may be used for populating the second list with each corresponding first answering signal from the at least zero active RFID cards. The second list may distinguish the RFID cards by means of their unique content, e.g. by their identifier. The format (e.g. of its entries) of the first list and the second list may be similar in a way that an RFID card of the first list is recognizable as the same RFID card in the second list. For instance, the first list and the second list may store the RFID cards' identifier and/or another part of their unique content. The similar format of the first list and the second list may ease or facilitate the compare the entries of the first list with the entries of the second list.

By comparing the entries of the first list with the entries of the second list, each of the at least zero passive RFID cards is identified by having its corresponding first answering signal in the first list but not in the second list. Note that this step can be performed, additionally or alternatively, while populating the second list. Analogously, also active RFID cards can be identified. This method may be performed once, on demand, and/or repeated in a predefined interval.

This method may contribute to provide means to tell passive RFID cards from active RFID cards in a fast and easy way. This piece of information may be used for some kind of individual communication with the RFID cards, e.g. for sending push-messages only to active RFID cards. The information may further be used, e.g. in a wireless charging system, to prevent passive RFID cards from being damaged.

In various embodiments, the method, further comprises the step of identifying each of the at least zero active RFID cards by having its corresponding first answering signal both in the first list and in the second list. This makes active RFID cards available for special treatment and/or further specified methods.

In various embodiments, the predefined pausing period is a first period specified for unloading the passive RFID card, the predefined pausing period is a second period specified for answering to the second RFID command, and/or the predefined pausing period is long enough to disturb any one of the RFID protocol levels.

Pausing for the first period may use the effect that passive RFID cards harvest their supply power from the NFC field, whereas active RFID cards, e.g. in a smartphone, have an internal power supply, e.g. by means of a battery. If the predefined pausing period is long enough to stop a passive RFID card's power supply, or to make them reset, no second answering signal can be sent by such a passive RFID card. In contrast, a power disruption for the first period will have no effect on active RFID cards. Pausing for the second period may have a different cause, which is caused by an effect that a passive RFID card gets its clock from an RFID and/or NFC carrier, which is generated by the RFID device, e.g. by the RFID reader. In contrast, active RFID cards run their clock from an internal source. Consequently, disturbing the passive RFID card's clock leads to a disturbance or malfunction of an externally recognizable part of an RFID specification. If the pausing period is long enough to disturb any one of the RFID protocol levels, this may violate an externally recognizable part of an RFID specification and, thus, lead to an error in the second answering signal, i.e. to the effect that a response signal from passive RFID cards is not recognized as a correct second answering signal. These alternatives may advantageously contribute to have a selection of options for distinguishing the types of RFID cards, dependent, e.g., on available recognition time, device sensitivity, implementation cost, and/or further factors.

In some embodiments, the first period is between 50 µs and 10 µs, particularly about 20 µs, and the second period is between 5 µs and 0.1 µs, particularly about 1 µs. This range may affect at least one part of an RFID specification.

In various embodiments, the first RFID command and/or the second RFID command is an RFID command according to an NFC-A, NFC-B, NFC-F, and/or NFC-V protocol. These embodiments may support multiband devices that are compliant to several frequency-ranges or frequency-bands of RFID.

In various embodiments, a wireless charging is only started if exactly zero passive RFID cards are identified. Alternatively—particularly in devices that are suitable and/or configured to perform this feature —, the charging is performed with reduced charging energy, i.e. the energy of the wireless charging may be reduced to a measure that does not harm passive RFID cards.

A further aspect relates to an RFID card identifying device, which is configured to support and/or execute a method described above and/or below.

A further aspect relates to a multiband wireless charging interface comprising an RFID card identifying device described above and/or below.

A further aspect relates to a vehicle comprising a passive RFID card identifying device described above and/or below.

A further aspect relates to a program element that is configured to perform a method described above and/or below, when executed on a computing system.

A further aspect relates to a computer-readable medium, where a program element described above is stored on.

A further aspect relates to using a passive RFID card identifying device described above described above and/or below, for distinguishing a passive RFID card from an active RFID card, and/or for preventing a passive RFID card to be damaged by charging.

For further clarification, the invention is described by means of embodiments shown in the figures. These embodiments are to be considered as examples only, but not as limiting.

DETAILED DESCRIPTION OF EMBODIMENTS

Figure 1A:
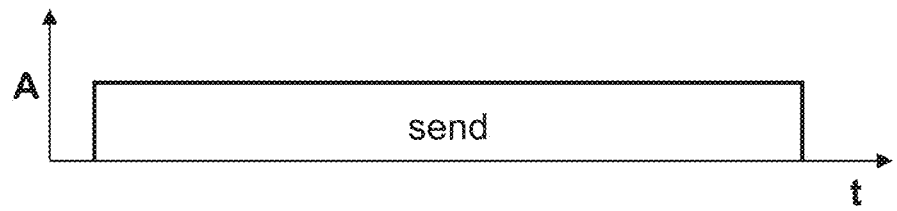
FIG. 1a schematically an envelope curve of a sequence of first RFID commands according to an embodiment.

FIG. 1a schematically shows an envelope curve of a sequence of first RFID commands according to an embodiment. The envelope curve has an amplitude A and lasts for a time period shown in the x-axis. It is clearly visible that during sending and after having sent the first RFID command, the RFID field is kept on, i.e. it is, for instance, not stopped or paused immediately after the first RFID command, but the RFID field maintained. The RFID field is kept "on" or is maintained at least for a time period long enough for not disturbing a function and/or a protocol entity of a passive RFID card. Disturbing may comprise any one of the RFID protocol levels. Examples may comprise to interrupt the passive RFID card's energy supply, its clock synchronization, any acknowledgement, and/or another externally recognizable part of an RFID specification.

Figure 1B:
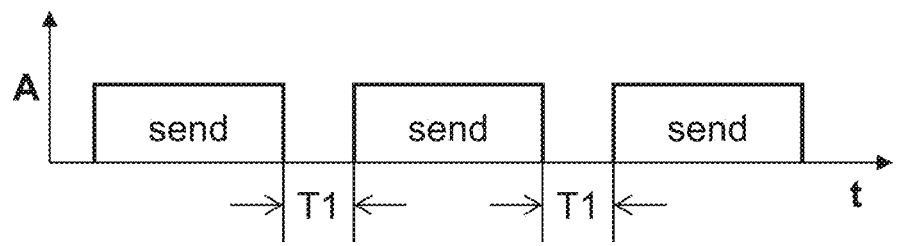
FIG. 1b schematically an envelope curve of a sequence of second RFID commands according to an embodiment.

FIG. 1b schematically shows an envelope curve of a sequence of second RFID commands according to an embodiment. In contrast to FIG. 1a, the RFID field is paused for a predefined pausing period T1 after sending the second RFID command. The duration of the predefined pausing period may depend on an RFID specification. The time period is at least long enough for disturbing a function of a passive RFID card. When pausing or stopping for a first period T1, as shown, the predefined pausing period is long enough to stop a passive RFID card's power supply, or to make the card reset, no second answering signal can be sent by such a passive RFID card. In contrast, a power disruption for the first period T1 will have no effect on active RFID cards. Thus, passive RFID cards and active RFID cards can be distinguished by an RFID device as described above and/or below.

Alternatively, pausing may last for a second period T2 (instead of T1, as shown). Interrupting for the second period T2 may cause a different disturbing effect on a passive RFID card. This effect may appear, because a passive RFID card get its clock from an RFID and/or NFC carrier, which is generated by the RFID device, e.g. by the RFID reader. In contrast, active RFID cards run their clock from an internal source. Consequently, disturbing the passive RFID card's clock—either for the first period T1, or for the second period T2—leads to a disturbance or malfunction of an externally recognizable part of an RFID specification. In contrast, the function of active RFID cards is kept unchanged or changed in a way that does not result in a malfunction of an externally recognizable part of an RFID specification. Additionally, or as an alternative, the predefined pausing period is long enough to disturb any one of the RFID protocol levels.

Figure 2:
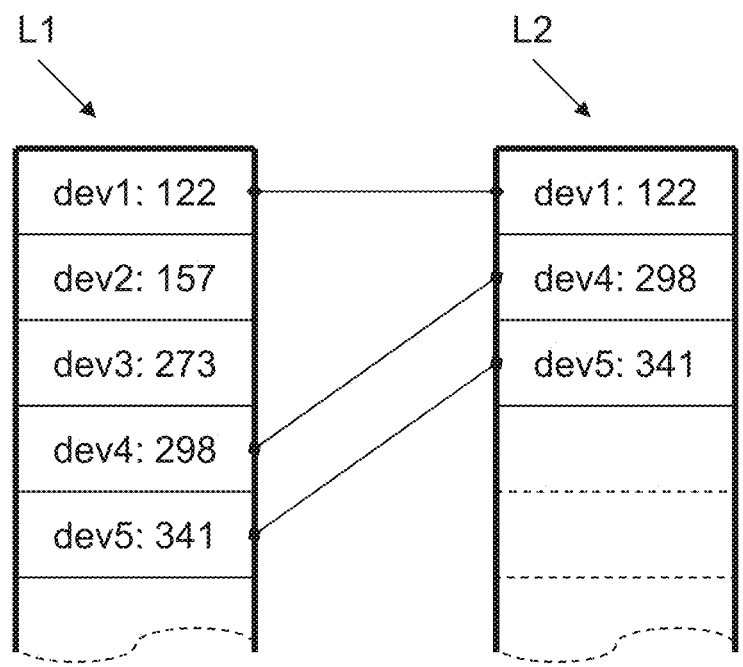
FIG. 2 schematically a section of a first list and a second list according to an embodiment.

FIG. 2 schematically shows a section of a first list L1 and a second list L2 according to an embodiment. After sending a first RFID command, while keeping an RFID field on (see FIG. 1a) first answering signals from both the passive RFID cards and the active RFID cards are received, if there are any passive or active RFID cards positioned within an "RFID distance". In the example shown, five RFID cards are found. The first list L1 shows first answering signals from RFID cards dev1 to dev5. The RFID cards can be distinguished by means of their identifier (or by another unique content). Thus, the entries of the first list L1 comprise the RFID cards' identifier, i.e. "122", etc. After sending a second RFID command (see FIG. 1b), second answering signals, only from the active RFID cards are received and entered into the second list L2. By comparing the entries of the first list L1 with the entries of the second list L2, each of the at least zero passive RFID cards is identified by having its corresponding first answering signal in the first list L1 but not in the second list L2. By this comparison, dev2 and dev3 are identified as passive RFID cards, because they have their corresponding first answering signal in the first list L1, but not in the second list L2.

Figure 3:
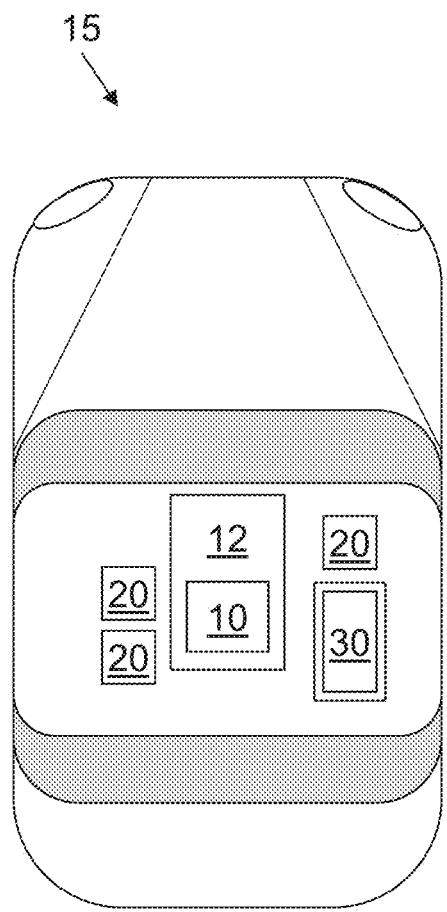
FIG. 3 schematically a vehicle according to an embodiment.

FIG. 3 schematically shows a vehicle 15 according to an embodiment. In the vehicle 15, a multiband wireless charging interface 12, comprising an RFID card identifying device 10, is arranged. Furthermore, three passive RFID cards 20 and one active RFID card 30 are arranged, within the vehicle 15 and within an "RFID distance". By performing a method as described above and/or below, the RFID cards 20 and 30 can be detected and distinguished the RFID card identifying device 10. This distinguishing may be used for not starting the charging by the multiband wireless charging interface 12, or to reduce the charging energy.

The invention claimed is:

1. A method for identifying an RFID card as a passive RFID card or an active RFID card, the method comprising the steps of:
    sending a first RFID command, while keeping an RFID field on;
    receiving, from each of at least zero passive RFID cards and at least zero active RFID cards, a corresponding first answering signal;
    populating a first list with each corresponding first answering signal from the at least zero passive RFID cards and the at least zero active RFID cards;
    sending a second RFID command, wherein the RFID field is paused for a predefined pausing period after sending the second RFID command;
    receiving, from the at least zero active RFID cards, a corresponding second answering signal;
    populating a second list with each corresponding second answering signal from the at least zero active RFID cards;
    comparing entries of the first list with entries of the second list;
    identifying each of the at least zero passive RFID cards by having its corresponding first answering signal in the first list but not in the second list;
    wherein the predefined pausing period is a first period that is specified for unloading an energy of the passive RFID card,
    the predefined pausing period is a second period that is specified for answering to the second RFID command, and/or
    the predefined pausing period is long enough to disturb any one of RFID protocol levels, and
    wherein the first period is between 50 µs and 10 µs, and the second period is between 5 µs and 0.1 µs.

2. The method of claim 1, further comprising the step of:
    identifying each of the at least zero active RFID cards by having its corresponding first answering signal both in the first list and in the second list.

3. The method of claim 1,
    wherein the first RFID command and/or the second RFID command is an RFID command according to at least one of NFC-A, NFC-B, NFC-F and NFC-V protocol.

4. The method of claim 1,
    wherein a wireless charging is only started if exactly zero passive RFID cards are identified, and/or the charging is performed with reduced charging energy.

5. An RFID card identifying device, which is configured to support and/or execute the method according to claim 1.

6. A multiband wireless charging interface comprising an RFID card identifying device according to claim 5.

7. A vehicle comprising a passive RFID card identifying device according to claim 5.

8. A non-transitory computer-readable medium containing program instructions, wherein execution of the program instructions by one or more processors of a computing system causes the one or more processors to carry out the method according to claim 1.

9. Distinguishing the passive RFID card from the active RFID card, and preventing the passive RFID card from being damaged by charging, by using the method according to claim 1.

10. The method of claim 1, wherein the second period is about 1 µs.

11. The method of claim 1, wherein the first period is about 20 µs.

12. The method of claim 11, wherein the second period is about 1 µs.

* * * * *